Sept. 28, 1954  F. E. BACHMAN  2,690,241
MAGNETIC FLUID BRAKE AND SUPPORT THEREFOR
Filed July 22, 1949  8 Sheets-Sheet 1

INVENTOR.
Fred E. Bachman
BY

Fig. 4.

Sept. 28, 1954           F. E. BACHMAN           2,690,241

MAGNETIC FLUID BRAKE AND SUPPORT THEREFOR

Filed July 22, 1949           8 Sheets-Sheet 3

INVENTOR.
Fred E. Bachman

Sept. 28, 1954  F. E. BACHMAN  2,690,241
MAGNETIC FLUID BRAKE AND SUPPORT THEREFOR
Filed July 22, 1949  8 Sheets-Sheet 5

INVENTOR.
Fred E. Bachman

Sept. 28, 1954  F. E. BACHMAN  2,690,241
MAGNETIC FLUID BRAKE AND SUPPORT THEREFOR
Filed July 22, 1949  8 Sheets-Sheet 6

INVENTOR.
Fred E. Bachman
BY
Atty

Patented Sept. 28, 1954

2,690,241

UNITED STATES PATENT OFFICE 2,690,241

MAGNETIC FLUID BRAKE AND SUPPORT THEREFOR

Fred Edward Bachman, St. Louis, Mo., assignor to American Steel Foundries, Chicago, Ill., a corporation of New Jersey Application July 22, 1949, Serial No. 106,258

7 Claims. (Cl. 188—205)

This invention relates to magnetic fluid brakes wherein the brake rotor and stator means are coupled during a braking operation by magnetized particles in a slurry or mixture of such particles and a liquid such as oil, and more particularly to such a brake adapted to withstand the conditions of railway service and to dissipate the great heat developed in braking a railway car.

A general object of the invention is to devise a magnetic fluid brake which may be readily assembled and disassembled and which is capable of long life in railway service.

Another object of the invention is to remove heat from the brake by circulating the magnetizable brake fluid through a heat exchanger or radiator and through a housing containing the brake rotor and stator parts. In certain types of service where the magnetic fluid becomes substantially solid in a magnetic field during a brake application, the fluid may be circulated between brake applications and in other types of service where the magnetic particles which couple the rotor and stator surfaces in a magnetic field are in such concentration as not to prevent the flow of the nonmagnetic liquid in which the particles are mixed or suspended, this liquid may be circulated during a brake application to remove heat from the brake.

A further object of the invention is to devise an arrangement wherein a sealed housing contains rotor and stator plates defining a labyrinthian passage for the flow of brake fluid through the housing as above described.

Another object of the invention is to devise a segmental brake rotor housing which may be readily sealed to a stator support sleeved within the housing.

Still another object of the invention is to provide a novel stator mounting wherein the stator plates are connected to a coil housing mounted on the stator support, said housing containing one or more electromagnetic coils and having external stator surfaces adapted to cooperate with rotor surfaces of the rotor housing to frictionally resist rotation thereof when the coils are energized to produce a magnetic field causing the magnetizable brake particles of the brake fluid to form chains connecting the rotor and stator surfaces.

The foregoing and other objects and advantages of the invention will become apparent from a consideration of the following specification and the accompanying drawings, wherein:

Figures 17 to 19 illustrate a modification of the embodiment shown in Figures 14 to 16, Figure 17 being a sectional view taken in the radial plane indicated by the line 17—17 of Figure 18, Figure 18 being a fragmentary side elevational view taken from the inboard side of the brake structure from the left of Figure 17, with the inboard rotor housing segment removed, the left half of Figure 18 being shown in section on the line 18—18 of Figure 17.

Referring first to the embodiment of Figures 1 to 7, the novel brake is illustrated as applied to a conventional railway car truck including a truck frame 2 having side rails 4, an end rail 6 at each extremity of the frame, and a transom 8 adjacent each end rail.

Each side rail 4 is formed adjacent each end thereof with spaced pedestals 9 (Figure 2) adapted for guiding engagement with a journal box 10 of a wheel and axle assembly 12 having spaced wheels 14 and an axle 16. Each box is adapted to support in the usual manner one end of an equalizer 18 from which the frame 2 is supported in the usual manner by springs (not shown).

A brake support generally designated 20, comprises a transverse beam 21 connected to the transom 8 by spaced brackets 22, each containing an annular pad 24 of resilient material such as rubber surrounding the beam and having an annular metallic bushing 26 clamped in the bracket. The beam 21 is provided at each end thereof with a stator support or torque arm 28 and a guide arm 30 having substantially identical hubs 32 and 34, respectively, sleeved on the beam and secured thereto as by set screws 36 (Figure 1), the hubs being connected by a pin or key 38 for movement in unison as the truck frame 2 moves with respect to the wheel and axle assembly 12 under service conditions due to irregularity in the track or other causes well known to those skilled in the art.

Figure 1:
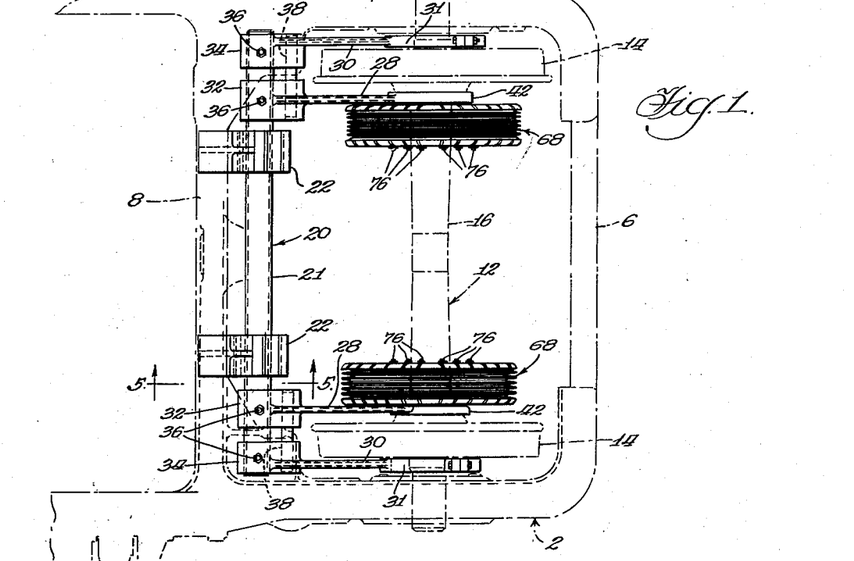
Figure 1 is a fragmentary top plan view of a railway car truck, shown in phantom lines, and a preferred embodiment of the novel brake applied thereto.
Figure 2:
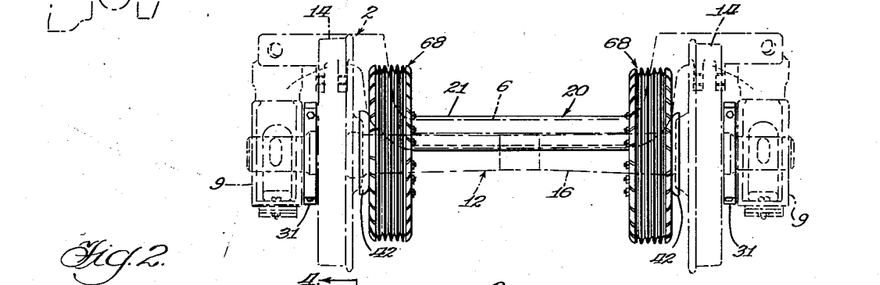
Figure 2 is a side elevational view of the structure shown in Figure 1, with the truck frame supporting springs removed to clarify the illustration of the brake parts.
Figure 3:
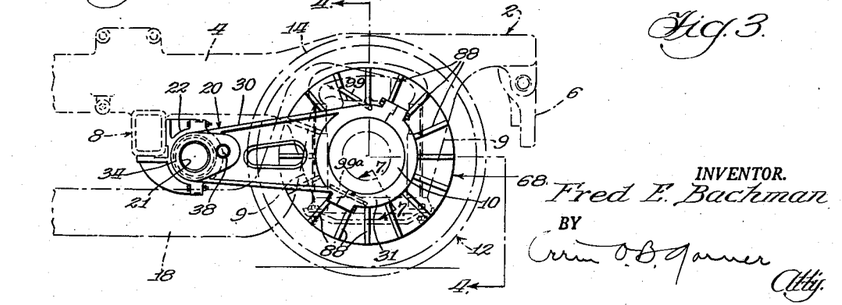
Figure 3 is an end view of the structure shown in Figure 1.

Thus it will be understood that this arrangement accommodates rotative adjustment of the hubs 32 and 34 on the beam 21 which is sub­stantially cylindrical in form as best seen in Figure 2. The novel arrangement also accommodates adjustment of the hubs 32 and 34 lengthwise of the beam without disassembly of the pin 38 inasmuch as this pin is arranged in parallel relationship to the beam and is received within complementary openings of the hubs, as shown in Figures 1 and 2.

Each guide arm 30, as best seen in Figures 1 to 4, comprises a hub or journal 31 slidably jour­naled within an annular groove 40 (Figure 4) in the associated journal box 10 for movement concentric with the rotational axis of the assembly 12 as the frame 2 moves vertically with respect thereto.

Figure 4:
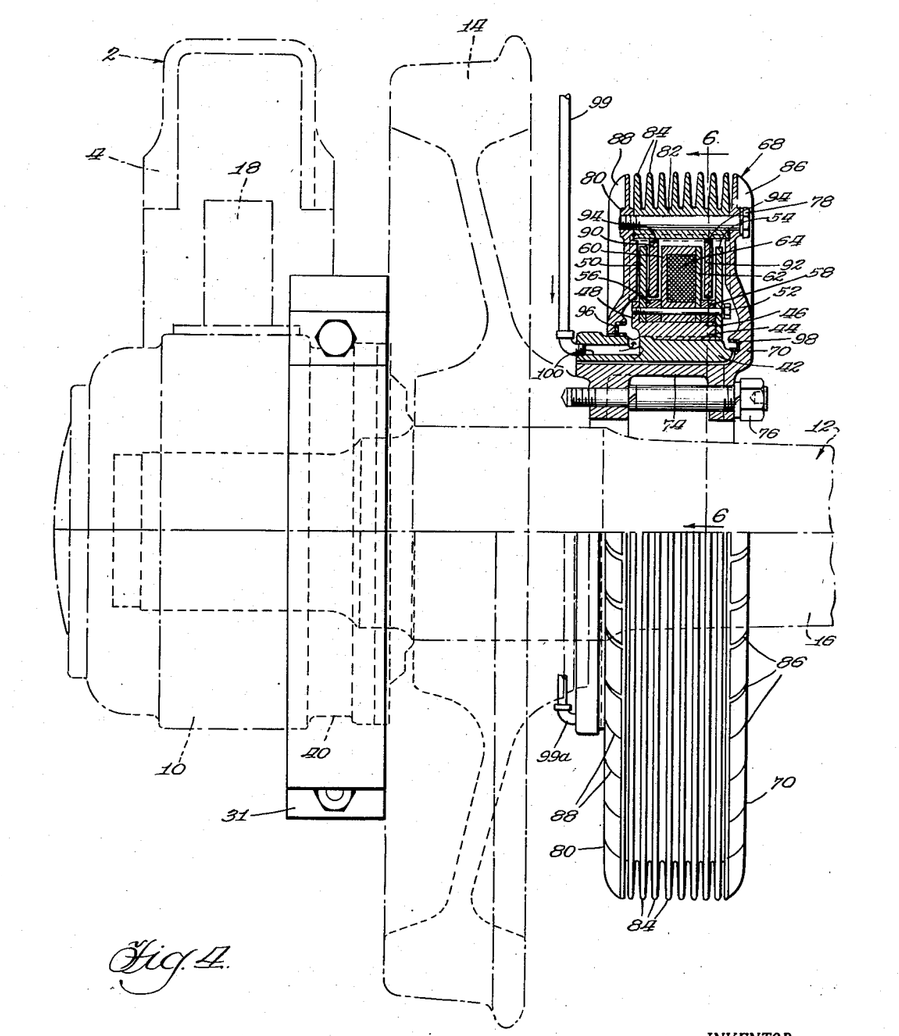
Figure 4 is a sectional view on the line 4—4 of Figure 2.
Figure 5:
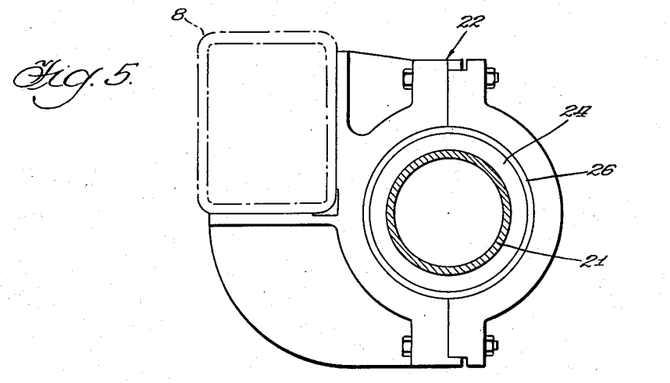
Figure 5 is a sectional view on the line 5—5 of Figure 1.
Figure 7:
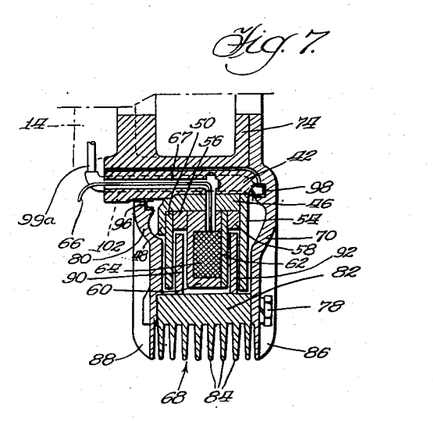
Figure 7 is a fragmentary sectional view on the line 7—7 of Figure 2.

Each torque arm 28, as best seen in Figure 1, is connected to a stator ring 42, which, as shown in Figures 4 and 7, is keyed by splines 44 to a ring 46 press-fitted thereon. The ring 46 comprises an outboard flange 48 affording a seat for an annular stator plate 50, and the flange is bolted at 52 to another stator plate 54. A pair of spacer rings 56 and 58 and an intermediate coil housing 60 and cover plate 62 therefor are clamped between the plates 50 and 54.

The housing 60 contains electromagnetic means, somewhat diagrammatically illustrated for the sake of clarity in the form of a plurality of electromagnetic coils 64 to which electrical cur­rent is supplied by one or more leads 66 extend­ing through a passage 67 (Figure 7) in the rings 42 and 46. Preferably the coils 64 are connected in series to a conventional voltage supply (not shown) by two leads 66, one of the leads being connected to the coil at one end of the series and the other being connected to the coil at the other end of the series. It will be understood, however, that one lead 66 will suffice, if the coil at the opposite end of the series is grounded to the torque arm 28, with one terminal of the voltage supply similarly grounded and the other terminal connected to the lead 66. Further­more, if desired, the coils 64 may be arranged in parallel with two leads 66 for each coil or one lead for each coil, with the latter grounded as above described through the torque arm 28.

Figure 6:
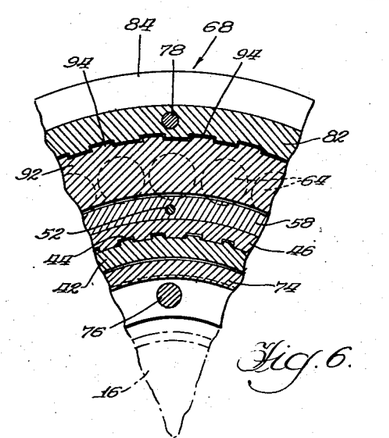
Figure 6 is a sectional view on the line 6—6 of Figure 4.

The stator plates 50 and 54 and coil housing 60 are contained within a rotor housing gen­erally designated 68 and comprising an inboard annular plate or segment 70 connected to a hub 74 which is secured as by studs 76 to the ad­jacent wheel 14. The plate 70 is removably secured as by studs 78 to an inboard plate 80, and a ring 82 is clamped between said plates, the ring being formed with radial heat radiating fins 84, and the plates 70 and 80 being formed with radial heat radiating fins 86 and 88 respectively. Rotor rings or plates 90 and 92 are press fitted in the housing ring 82 and are connected there­to by splines 94 (Figure 6).

The housing 68 is provided with fluid sealing rings 96 and 98, and the interior of the housing is adapted to form a chamber or container for a body of magnetizable fluid such as for example a slurry of oil and particles of iron in its ele­mental state or in magnetizable compounds or alloys thereof.

This fluid, upon energization of the coils 64, during a brake application, is adapted to fric­tionally couple the rotor plates 90, 92, prefer­ably formed of a magnetizable metal such as iron, to the stator plates 50, 54 and to the stator coil housing 60 and cover plate 62 which are also preferably formed of a magnetizable metal. Heat developed during such a brake application is ra­diated by the fins 84, 86 and 88; and between brake applications, or during such applications where the slurry is of suitable consistency, the slurry may be circulated through the rotor hous­ing 68 by an inlet line 99 (Figure 4) connected to an inlet passage 100 at the upper side of the stator support member 42, and by an outlet pas­sage 102 (Figure 7) through said member at the lower side thereof, connected to an outlet line 99a (Figure 2).

It may be noted that the inlet passage 100 is connected to the housing 68 at the outboard side thereof and the outlet passage 102 is connected to the inboard side of the housing 68, the rotor plates 70, 80, 90 and 92 being spaced from the stator plates 50 and 54 and from the stator coil housing 60 and cover plate 62 and also from the stator spacers 56, 58 to afford a labyrinthian passage be­tween the inboard and outboard sides of the rotor housing 68, whereby the brake fluid may be circulated therethrough and may be passed through a conventional heat exchanger or radi­ator (not shown) to cool the fluid which may then be returned to the inlet passage 100. In this manner heat developed during a braking ap­plication may be quickly and efficiently removed from the brake structure within the housing 68.

Another feature of the invention is the manner in which the torque arms 28 transmit braking torque to the beam 21 and are spaced from and keyed to the guide arms 30, which maintain concentricity between the rotor and stator parts of the brake, thereby simplifying the construc­tion of the device by eliminating the necessity of providing torque arms with complicated and expensive bearings to maintain concentricity.

Figure 8:
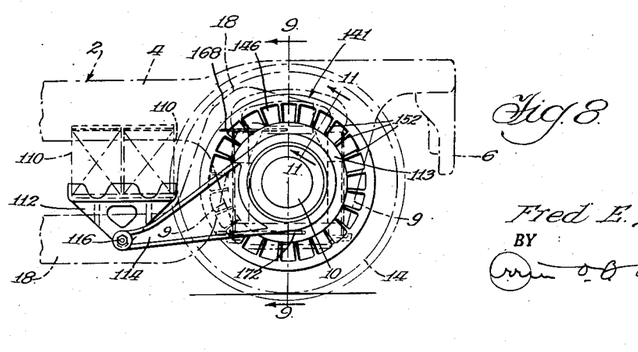
Figure 8 is a side elevational view of a truck having another embodiment of the novel brake applied thereto.

Referring now to the embodiment of Figures 8 to 11, the brake parts are entirely supported by unsprung parts of the truck, which are identified by numerals corresponding to those of Figures 1 to 7; and it may be noted that in Figure 8, the springs which support the frame 2 from the equalizer 18 are diagrammatically shown at 110 and a conventional equalizer spring seat 112 is also shown, inasmuch as the brake parts are not obscured by the springs 110 and seat 112 in this modification.

In this modification, the outboard end of the journal box 10 is secured as by welding to a hub 113 of a torque arm 114 having one end thereof anchored as by a bolt and nut assembly 116 to the equalizer 18, said assembly 116 also affording a convenient connection between the equalizer 18 and spring seat 112.

The inboard end of the journal box 10 is connected as by studs 118 to a stator support hub or ring 120 having a press fit within a coil housing 122, which is provided with a cover plate 124, the ring 120 being in splined torque transmitting engagement with the housing at 126 and with the plate at 128. The outer perimeter of the housing 122 supports a plurality of annular stator plates 130 in splined engagement with the housing as at 132 (Figure 10), said plates being separated by spacer rings 134 and being clamped against a flange 136 of the housing 122 by a clamping plate 138 and screws 140 which also secure the cover plate 124 to the housing 122.

The rotor housing 141 of the modification comprises an inboard plate or segment 142 having an axial flange 144 clamped to an outboard segment 146 by studs 148 which secure the segment 142 to the wheel 14. The flange 144 and segment 146 are provided with radial heat radiating fins 150 and 152 respectively.

An annular sealing ring 154 is provided between the segment 146 and the flange 144 and sealing rings 156 and 158 are provided between the stator support 120 and flanges 160 and 161 of the segments 142 and 146, respectively, thereby providing a sealed rotor housing or casing 141 surrounding the above-described stator structure.

Figure 9:
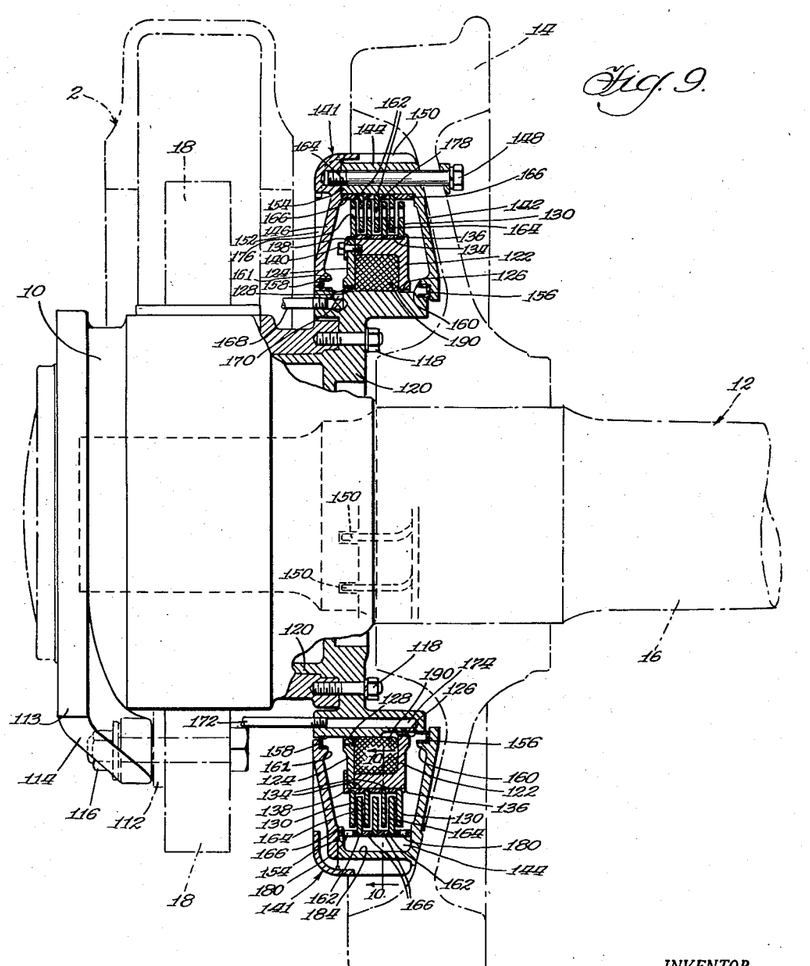
Figure 9 is a fragmentary end view of the structure shown in Figure 8, partly in section on the line 9—9 thereof.

The inner perimeter of the flange 144 is afforded a splined connection as at 162 with a plurality of rotor plates 164 and spacers 166 clamped between the segments 142 and 146, and the rotor plates as best seen in Figure 9 are alternately arranged in spaced relationship with the stator plates 130, to define therewith a labyrinthian flow passage.

To afford circulation of the magnetizable brake fluid through the housing 141, an inlet line 168 is connected as seen in Figure 9 to the inboard side of the housing through a port 170 in the stator support 120, and an outlet line 172 is connected to the outboard side of the housing 141 through an outlet port or passage 174 in the support 120. During circulation of the brake fluid, the latter flows into the inlet port 170 and radially outwardly therefrom through aligned openings 176 and 178 in the stator and rotor plates 130 and 164 arranged in sets at intervals around the axis of the axle 16, one set of said openings being seen at the top of Figure 9. Fluid also flows through the labyrinthian passage between the rotor and stator plates and through ports 180 in the end spacers 166 and chambers 184 (Figures 9 and 10) in the flange 144.

Figures 11, 12:
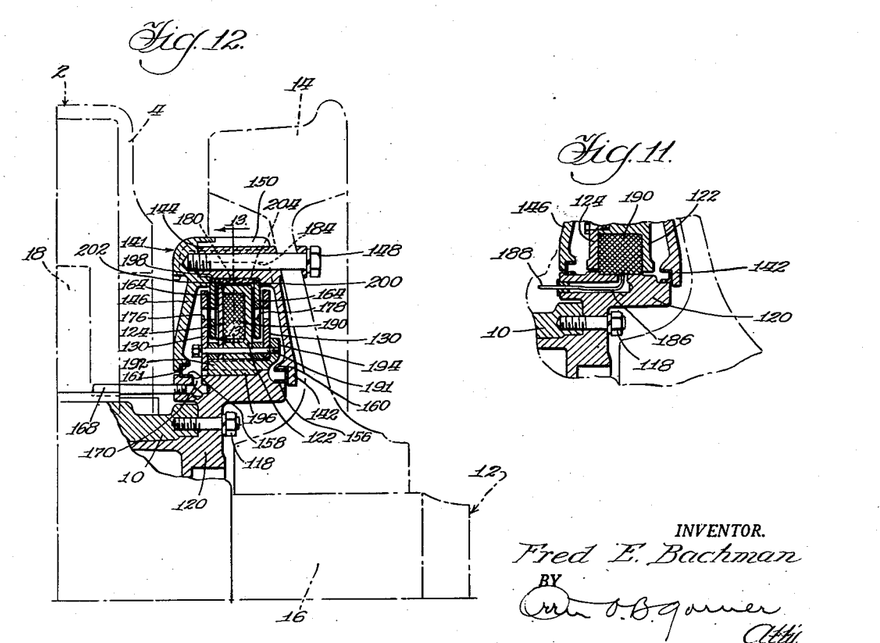
Figure 11 is a fragmentary sectional view on the line 11—11 of Figure 8.

Figure 11 shows the manner in which the stator support 120 is formed with a passage 186 for a lead 188 connected to the coil housing 122 as in the previously described embodiment, said housing containing one or more coils indicated at 190, which coils may be arranged in series with one or two leads 188 for the series, or arranged in parallel with one or two leads for each coil, as in the previously described embodiment.

Figures 10, 13:
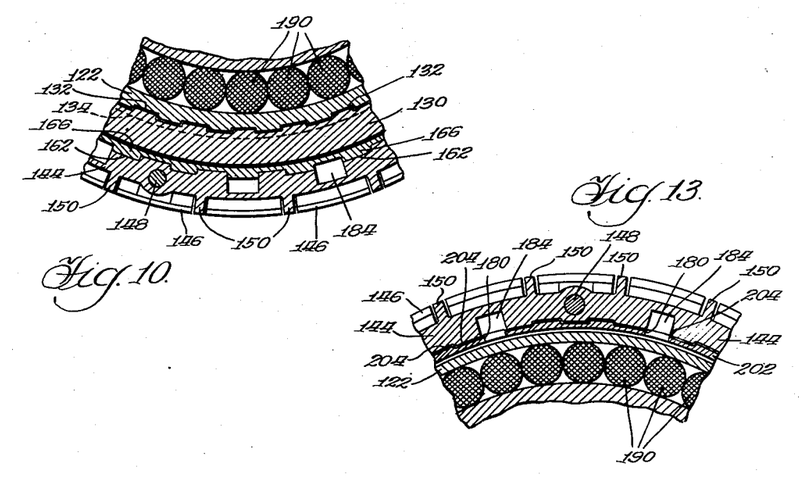
Figure 10 is a sectional view on the line 10—10 of Figure 9.
Figures 12 and 13 show a modification of the embodiment of Figures 8 to 11, Figure 12 being a fragmentary sectional view corresponding to that of Figure 9, and Figure 13 being a sectional view on the line 13—13 of Figure 12.

Figures 12 and 13 show a modification of the device shown in Figures 8 to 11 and corresponding parts are identified by corresponding numerals, the principal difference being the mounting of the stator plates 130 and the annular coil housing 122 and cover plate 124 which are clamped by studs 191 on a sleeve 192 between the outboard edge thereof and a flange 194 at the inboard end of the sleeve 192, which is press-fitted on and splined at 196 (Figure 12) to the stator support ring 120. Also in this modification the rotor plates 164 are clamped between shoulders 198 and 200 of the rotor housing segments 146 and 142, a spacer ring 202 being interposed between the rotor plates. The rotor plates and spacer are splined as at 204 to the flange 144 of the inboard segment 142 of the housing 141. As best seen in Figure 12, the magnetizable brake fluid is circulated through an inlet pipe 168 and inlet port 170 of the stator support to the inboard side of the housing 141, and the fluid flows through openings 176 and 178 in the stator plates 130, and rotor plates 164 respectively and through ports 180 in the spacer ring 202 and ports 184 of the flange 144 to the inboard side of the housing and outwardly therefrom by an outlet pipe (not shown) as in the embodiment of Figures 8 to 11.

Figure 14:
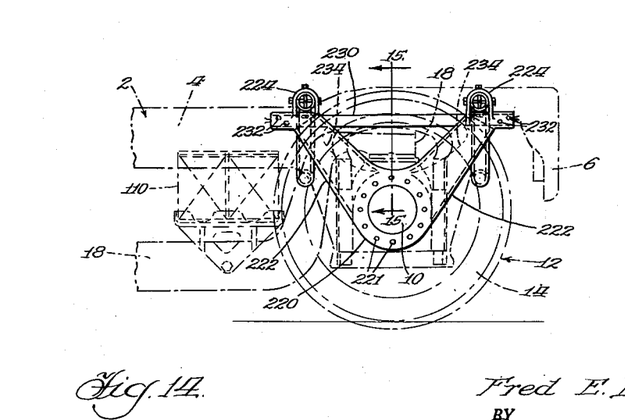
Figure 14 is a side elevational view of a truck and another embodiment of the novel brake applied thereto.
Figure 15:
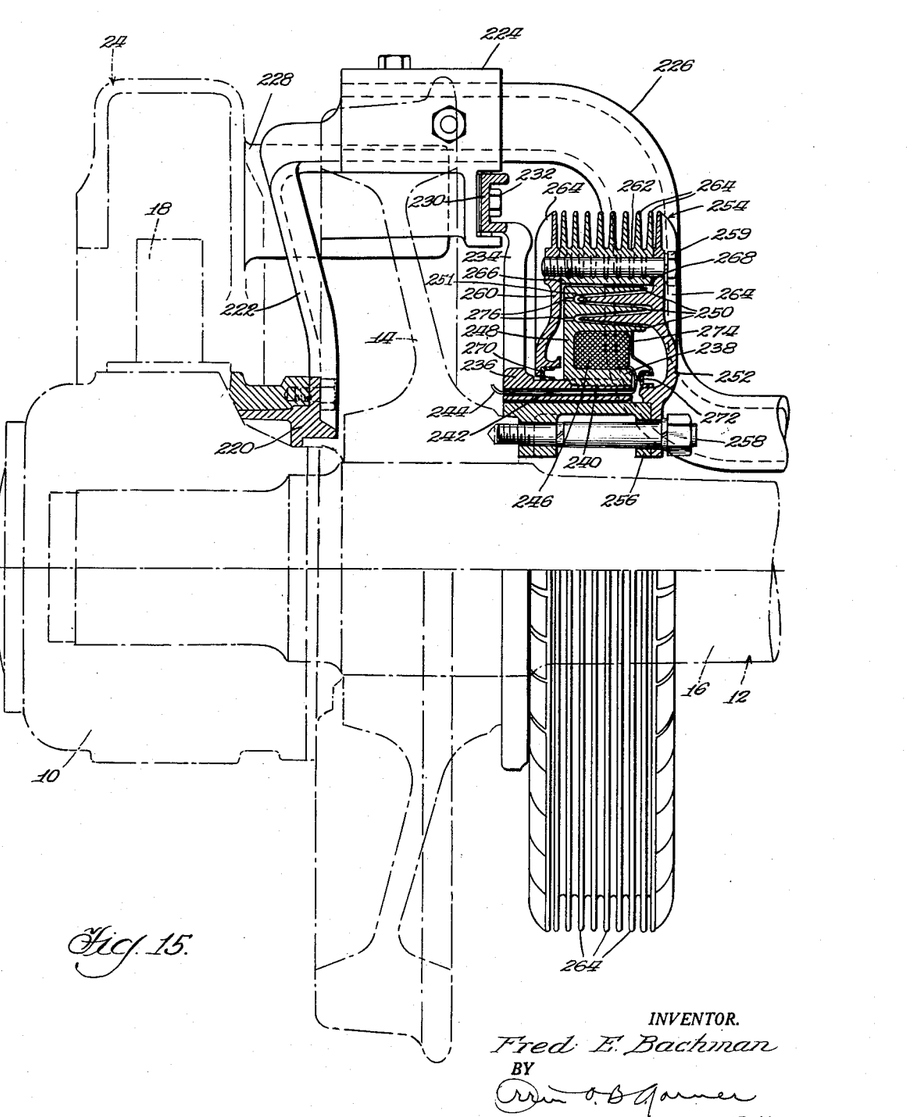
Figure 15 is an end view of the structure shown in Figure 14, partly in section on the line 15—15 thereof.
Figures 16, 16A, 16B, 19:
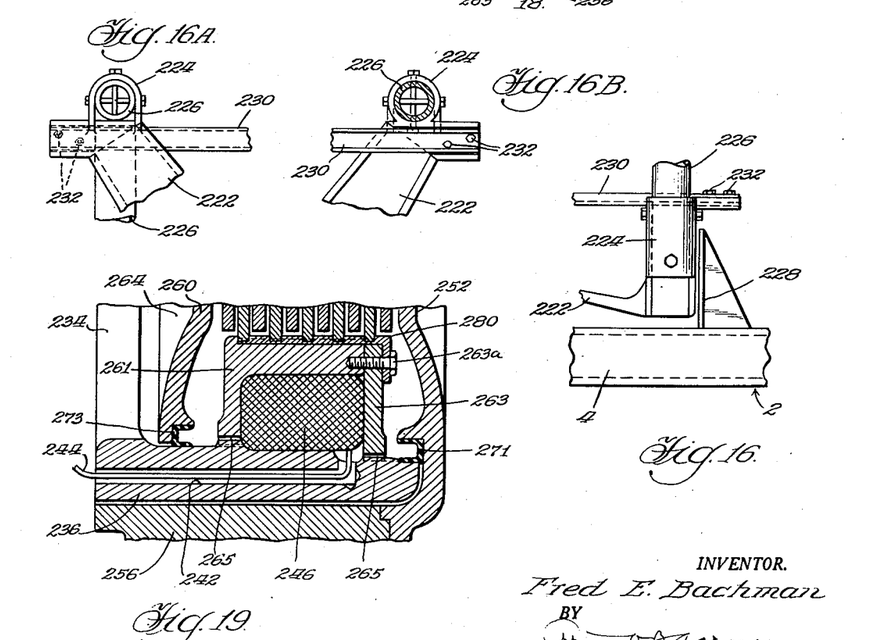
Figures 16, 16A and 16B are fragmentary, enlarged views of the stator support, Figure 16 being a fragmentary top plan view of the torque connection between the truck frame and stator support shown in Figure 15, Figure 16A being an outboard elevational view of the stator support, and Figure 16B being an inboard elevational view thereof.
Figure 19 being a sectional view through the brake stator and coil housing support taken in a radial plane through a passage for an electrical lead.

Figures 14 to 16 show another embodiment of the device wherein the truck frame 2, equalizer 18, springs 110 and parts of the wheel and axle assembly 12 are identified by the numerals used in connection with the preceding embodiments.

In Figures 14 to 16, the stator support comprises a hub 220 mounted on the inboard side of each journal box 10 as by screws 221. The hub is formed with spaced arms 222 diverging therefrom and provided at their upper ends with brackets 224 receiving transverse tie rods or bars 226 extending transversely across the truck for connection to the arms 222 associated with the journal box 10 at the other end of the wheel and axle assembly, only one box 10 and associated arms being shown for the sake of simplicity.

The arms 222 of each box 10 are confined between torque lugs or stops 228 on the inboard surface of the truck frame side rail 4 to transmit braking torque through said stops to the frame 2.

A stator support bar 230 is removably secured as by screws 232 to the arms 222 and as best seen in Figures 14 and 15, the bar 230 is formed with a pair of depending legs 234 converging toward and connected to a stator support ring 236 (Figure 15) having an annular coil housing 238 press-fitted and splined thereon as at 240 (Figure 15). The stator support ring 236 is formed with one or more lead passages 242 for one or more leads 244 connected to the coils diagrammatically shown at 246, as in the previously described embodiments.

The outboard side of the coil housing 238 is provided with a radial flange 248 having a plurality of axially tapered flanges 250 extending inboardly therefrom, said flanges being alternately arranged with and spaced from similar flanges 251 on an inboard segment or plate 252 of a rotor housing 254, said plate being connected to a hub 256 and to the wheel 14 as by studs 258.

The housing 254 also comprises an inboard segment or plate 260 and a ring 262 clamped by studs 259 between the plates 252 and 260 at their outer perimeters, the ring 262 and plates being provided with radial heat radiating fins 264. Sealing rings 266 and 268 are clamped between the ring 262 and the plates 260 and 252 respectively. A sealing ring 270 is provided between the outboard plate 260 and the stator support ring 236, and a sealing ring 272 is provided between the inboard plate 252 and the inner perimeter of a flanged cover plate 274 at the inboard side of the coil housing 248.

Thus the rotor housing 254 provides a sealed chamber or receptacle therewithin for the circulation of magnetizable brake fluid through inlet and outlet passages (not shown) of the stator ring 236, as in the previously described embodiments. The fluid flows from the outboard side of the housing 254 through ports 276 in the flange 260 and through the space between the outer flange 250 and the ring 262 and thence through annular space between the flanges 250 and 251 to the inboard side of the housing. As in the previously described embodiments, the inlet passage (not shown) of the stator support ring 236 is connected at approximately the top thereof to the outboard side of the housing 254, and the outlet passage (not shown) is disposed at approximately the bottom of the ring 236 and is connected to the inboard side of the housing 254.

Figure 17:
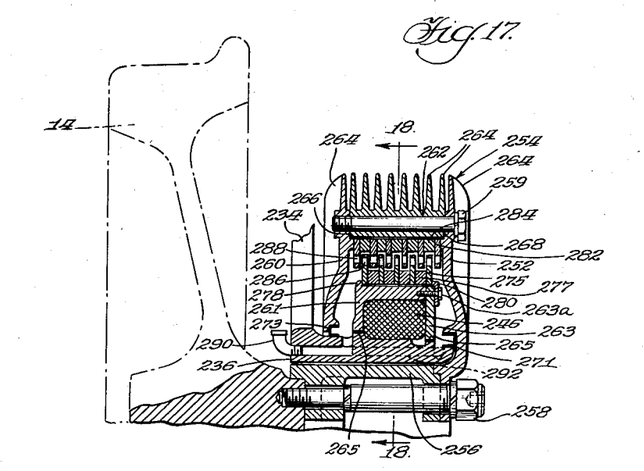
Figure 18:
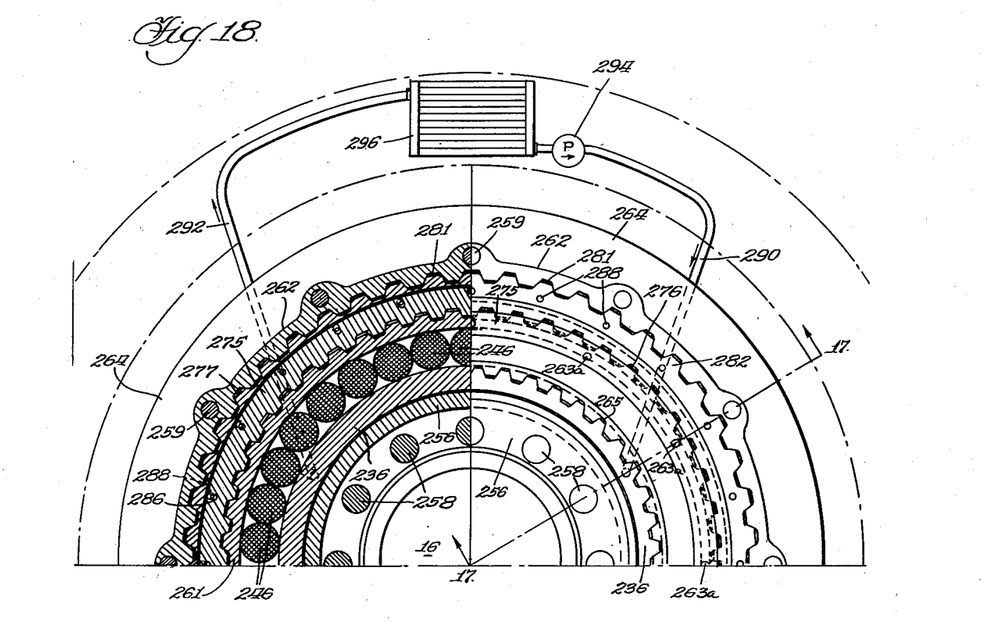

Figures 17 to 19 show a modification of the brake arrangement of Figures 14 to 16, together with a flow diagram in Figure 18 of a conventional fluid circulating and cooling system which may be used in conjunction with all of the preceding embodiments and modifications thereof. Parts of the structure shown in Figures 17 to 19 are identified by the same numerals as those applied to corresponding parts of Figures 14 to 16, the principal differences being the mounting of the coil housing and the rotor and stator plates as hereinafter described.

As clearly shown in Figure 17, an annular coil housing 261 and cover plate 263 are secured together by studs or screws 263a and are sleeved over and splined at 265 to the annular stator support ring 236 which is sleeved within the rotor housing 254 and is sealed thereto by inboard and outboard sealing rings 271 and 273.

A plurality of stator plates 275 and spacers 277 are sleeved over the housing 261 and are splined thereto as at 277 (Figure 18). These plates and spacers are snugly confined against each other and against a flange 279 of the housing 261 by an annular washer 280 secured by the studs 263a.

A plurality of rotor plates 282 and spacers 284 are compressed in a stack between the rotor housing segments 252 and 260 and are splined to the housing ring 262 as at 281 (Figure 18). The rotor plates 282 are interleaved with the stator plates 275 and are spaced therefrom to define a labyrinthian flow passage, and the plates 275 and 282 are also provided with radially overlapping ports 286 and 288 respectively, said passage and ports accommodating flow of the brake fluid through the housing by an inlet line 290 and an outlet line 292 connected respectively to a pump 294 (Figure 18) and a heat-exchanger or radiator 296, the suction side of the pump being connected to the radiator to form a closed circuit for forcing brake fluid through the rotor housing 254 and then through the radiator 296 to dissipate the heat developed during a braking operation.

The inlet line 290, as best seen in Figure 17, is connected to the outboard side of the rotor housing 254 and the outlet line 292, as in the previously described embodiments, is connected to the inboard side of the rotor housing 254, whereby fluid flowing between said lines passes through the ports 286, 288 and the labyrinthian flow passage defined by the rotor and stator plates 282 and 272.

Thus it will be understood that I have devised a novel brake wherein a brake fluid containing magnetic particles is subjected to a magnetic field between rotor and stator surfaces which in all of the above-described embodiments and modifications are preferably formed of magnetizable material to adhere to said particles which when magnetized form chains between the rotor and stator surfaces, thereby frictionally resisting rotation of the rotor surfaces. Furthermore, the fluid and the particles may be circulated in all embodiments through a heat exchanger or radiator between brake applications, and if the concentration of the particles within the fluid is such as to permit flow of fluid through the housing when the brake is applied, the fluid may be circulated during a brake application. The invention also comprehends a novel support structure particularly adapted for application to modern railway car trucks without disturbing the truck parts during assembly and disassembly of the brake to service the latter.

I claim:

1. In a brake arrangement for a railway car truck having a truck structure and a supporting wheel and axle assembly including an axle and a wheel; the combination of an annular rotor housing encircling the axle and containing fluid and magnetizable particles suspended therein, readily removable means connecting the housing to said wheel, said housing comprising a plurality of separable segments and readily removable means for interconnecting said segments, an annular stator support encircling the axle and sleeved within said housing in substantially fluid tight engagement therewith, a support ring in said housing sleeved over said stator support and splined thereto against relative rotation, electro-magnetic means housed in said ring and encircling the axle for developing a magnetic field in the housing, a plurality of magnetizable stator rings carried by said support ring, a plurality of magnetizable rotor rings carried by the housing and interleaved with the stator rings in spaced relationship thereto thereby defining a fluid passage between said rotor and stator rings, said passage communicating with the housing at the inboard and outboard sides of said rings, inlet and outlet ports extending through the stator support and the support ring, one of the ports being connected to the inboard side of the housing and the other port being connected to the outboard side of the housing, and a torque connection between said stator support and said truck structure.

2. In a brake arrangement for a railway car truck having a truck frame resiliently supported from a wheel and axle assembly including an axle and spaced wheels; the combination of a substantially cylindrical beam resiliently connected to the structure, annular rotor housings secured to respective wheels and encircling the axis of said assembly, annular stator supports sleeved within respective housings, brake means carried by said supports for decelerating said housings, support means for each stator support comprising a pair of arms, one connected to the support and the other journaled on said assembly for rotational movement substantially on said axis, said arms having hubs movably sleeved on the beam for adjustment lengthwise of the beam and for rotatable adjustment relative to the beam, readily releasable means for securing the hubs to the beam against movement relative thereto, and a readily removable key extending through openings of the arms of each pair, said key being disposed between the beam and the related wheel and extending approximately parallel to the beam.

3. In a brake arrangement for a railway car truck having a truck frame resiliently supported from a wheel and axle assembly including an axle and a rotatable wheel; the combination of an annular rotor housing secured to the wheel, an annular stator support encircling the axle and extending into the housing, brake means carried by the support and housing for decelerating the wheel, and support means for the stator support comprising a substantially cylindrical beam resiliently connected to the frame, spaced arms having hubs sleeved over the beam, said arms receiving the wheel therebetween, said hubs being adjustable lengthwise of the beam and rotatable with respect thereto, readily releasable means for securing the hubs to the beam against movement relative thereto, one of the arms being connected to the stator support and the other being journaled on said assembly, and a pin approximately parallel to the beam extending through complementary openings of said hubs and disposed between the wheel and the beam.

4. In a brake arrangement for a railway car truck comprising a wheel and axle assembly and a truck frame structure resiliently supported therefrom; the combination of a beam extending transversely of the truck and having an articulated connection to the frame structure, rotors secured to spaced wheels of said assembly, stators associated with respective rotors, means for frictionally coupling said rotors and stators, a torque arm connected to each stator and having a hub sleeved on said beam, guide arms journaled to said assembly for rotation substantially on the axis thereof during relative vertical movement of the frame, thereby maintaining concentricity between the rotors and stators, said arms having hubs sleeved on the beam and being adjustably movable lengthwise of the beam, readily releasable means for securing each hub to the beam against movement relative thereto, and a pin approximately parallel to the beam between each wheel and the beam, said pin being received within complementary openings of the related torque and guide arms to accommodate relative adjustment therebetween upon release of the associated releasable means.

5. In a brake arrangement for a railway car truck having a truck frame resiliently supported from a wheel and axle assembly including an axle and spaced wheels; the combination of a substantially cylindrical beam resiliently connected to the structure, annular rotor housings secured to respective wheels and encircling the axis of said assembly, annular stator supports sleeved within respective housings, brake means carried by said supports for decelerating said housings, support means for each stator support comprising a pair of arms, one connected to the support and the other journaled on said assembly for rotational movement substantially on said axis, said arms having hubs sleeved on the beam for adjustment lengthwise of the beam and for rotatable adjustment relative to the beam, readily releasable means for securing each hub to the beam against movement relative thereto, and pins disposed between the beam and the assembly, each pin being approximately parallel to the beam and extending through complementary openings in the arms of one pair to accommodate adjustment therebetween lengthwise of the beam without removal of said pin.

6. In a brake arrangement for a railway car truck having a truck frame structure supported by a wheel and axle assembly including a wheel and an axle; the combination of a stator support member journaled on said assembly and having spaced upwardly diverging arms extending diagonally upwardly from said member, the upper ends of said arms being disposed respectively at opposite sides of a vertical plane bisecting the axle along its longitudinal axis, torque lugs on said structure disposed at opposite sides respectively of said plane and engageable with said arms at their upper ends to transmit braking torque to said structure, a stator support carried by said arms, a rotor carried by the wheel for rotation therewith, and brake means carried by the stator support for decelerating the rotor.

7. A brake arrangement as described in claim 6 wherein the arms are provided with tie rods for connection to corresponding arms of a stator support member associated with another wheel of said assembly.

References Cited in the file of this patent

UNITED STATES PATENTS

| Number | Name | Date |
|---|---|---|
| 1,243,529 | Koch | Oct. 16, 1917 |
| 1,968,583 | Apple | July 31, 1934 |
| 2,174,395 | Aikman | Sept. 26, 1939 |
| 2,174,399 | McCune | Sept. 26, 1939 |
| 2,308,890 | McCune | Jan. 19, 1943 |
| 2,382,870 | Genssle et al. | Aug. 14, 1945 |
| 2,467,356 | Eksergian | Apr. 12, 1949 |
| 2,575,360 | Rabinow | Nov. 20, 1951 |

FOREIGN PATENTS

| Number | Country | Date |
|---|---|---|
| 485,591 | Belgium | Nov. 13, 1948 |

OTHER REFERENCES

"The Magnetic Fluid Clutch," by Jacob Rabinow, Transactions of the AIEE, vol. 67, December 13, 1948, 8 pages.